(12) United States Patent
Inoue et al.

(10) Patent No.: US 6,689,506 B2
(45) Date of Patent: Feb. 10, 2004

(54) SEALED ALKALINE STORAGE BATTERY WITH SAFETY VENT UNIT

(75) Inventors: Hiroyuki Inoue, Mihara-gun (JP); Hisashi Kakiuchi, Mihara-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 169 days.

(21) Appl. No.: 09/799,683

(22) Filed: Mar. 7, 2001

(65) Prior Publication Data

US 2001/0046620 A1 Nov. 29, 2001

(30) Foreign Application Priority Data

Mar. 10, 2000 (JP) .................................. 2000-066169
Feb. 27, 2001 (JP) .................................. 2001-052005

(51) Int. Cl.[7] .............................................. H01M 2/12
(52) U.S. Cl. .................................................... 429/54
(58) Field of Search ........................... 429/54, 57, 206

(56) References Cited

U.S. PATENT DOCUMENTS

| | | | | |
|---|---|---|---|---|
| 4,207,384 A | * | 6/1980 | Peters ......................... | 429/54 |
| 4,788,112 A | * | 11/1988 | Kung ........................... | 429/54 |
| 5,455,125 A | * | 10/1995 | Matsumoto ................... | 429/59 |
| 5,521,021 A | * | 5/1996 | Alexandres et al. .......... | 429/54 |
| 5,554,455 A | * | 9/1996 | Inoue et al. .................. | 429/53 |
| 5,567,539 A | * | 10/1996 | Takahashi ..................... | 429/57 |
| 5,747,187 A | * | 5/1998 | Byon ........................... | 429/58 |
| 6,255,013 B1 | * | 7/2001 | Marukawa et al. ........... | 429/82 |
| 6,326,100 B1 | * | 12/2001 | Han et al. ..................... | 429/57 |

FOREIGN PATENT DOCUMENTS

| | | | | |
|---|---|---|---|---|
| EP | 757394 | * | 2/1997 | ............ H01M/2/34 |
| JP | 408339793 A | * | 12/1996 | ............ H01M/2/12 |
| JP | 9-27310 | | 1/1997 | |
| JP | 2001052005 | * | 11/2001 | ............ H01M/2/12 |

* cited by examiner

*Primary Examiner*—Mark Ruthkosky
(74) *Attorney, Agent, or Firm*—Wenderoth, Lind & Ponack, L.L.P.

(57) ABSTRACT

The sealed alkaline storage battery is provided with a closing lid having a safety vent unit which closes a gas release hole in a sealing plate, and a positive electrode cap which houses the safety vent unit in a compressed state between itself and the sealing plate. The safety vent unit is provided with a ventage plate which closes the gas release hole, and a spring which spring-loads the ventage plate towards the gas release hole and has a compressive load to length deformation ratio $\leq 50$ N/mm.

12 Claims, 3 Drawing Sheets

US 6,689,506 B2

SEALED ALKALINE STORAGE BATTERY WITH SAFETY VENT UNIT

This application is based on application No. 66169 filed in Japan on Mar. 10, 2000 and application No. 52005 filed in Japan on Feb. 27, 2001, the contents of which are incorporated hereinto by reference.

BACKGROUND OF THE INVENTION

This invention relates to a safety vent apparatus of a sealed alkaline storage battery.

Sealed alkaline storage batteries such as nickel cadmium storage batteries and nickel hydride storage batteries are rechargeable batteries which use alkaline aqueous solutions as electrolyte.

As shown in FIG. 1, an alkaline storage battery 10 is a cylindrical metal external battery case 30 with a closed bottom end containing an electrode unit 12 together with electrolyte L and sealed at the open end of the external case 30 with a closing lid 80.

As shown in FIG. 1, the electrode unit 12 is formed by rolling a positive electrode plate 14, a negative electrode plate 16, and a gas permeable separator 18 intervening between the two electrode plates, into a spiral shape. The positive electrode plate 14 and the negative electrode plate 16 are formed by applying each of the active materials, nickel oxide and cadmium compounds to conducting electrode plates.

A positive electrode collector 20 is electrically connected to the upper end of the positive electrode plate 14, and the closing lid 80 is disposed above, and electrically connected to, the positive electrode collector 20.

The closing lid 80 is provided with a sealing plate 40 which is electrically connected to the positive electrode collector 20 and has a gas release hole 42 opened at its center, a safety vent unit 60 to close the gas release hole, and a positive electrode cap 70 to hold the safety vent unit 60 in a compressed state between the cap 70 and the sealing plate 40. The sealing plate 40 is caulked into the open end of the battery case 30 via an insulating gasket 76 to tightly close off and seal the external battery case 30.

In the sealed alkaline storage battery 10, when gas is generated internally as a result of conditions such as overcharge or over-discharge and the battery's internal pressure exceeds a given pressure, the safety vent unit 60, is activated and gas and electrolyte inside the battery are vented to the outside to prevent battery case deformation, etc.

In general, gas generated inside a battery due to overcharging is consumed inside the battery. However, if charging is continued unchecked, the rate of gas generation can exceed the rate of gas consumption resulting in internal pressure rising above equilibrium values. Therefore, when internal battery pressure rises abnormally, battery case deformation and closing lid protrusion are prevented by venting gas via the safety vent unit described above.

The safety vent unit 60 is made up of a rubber ventage plate 62 and a spring 64 to power the ventage plate 62. In this safety vent unit 60, when internal battery pressure exceeds a given value, the spring 64 is compressed, the ventage plate 62 moves to open the gas release hole 42, and gas and electrolyte are ejected to the outside through the gas release hole 42 in the sealing plate 40 and gas venting holes 78 provided in the positive electrode cap 70.

Here, the activation pressure to begin operation of the safety vent unit is the pressure which begins to distort the spring in that unit. FIG. 2 shows the relation of the change in spring length to the amount of pressure applied to the safety vent unit (internal battery pressure). As shown by line a in FIG. 2, when activation pressure is set low, gas generated inside the battery can be vented at an early stage of internal pressure increase. This allows the previously mentioned dangers of battery case deformation and closing lid protrusion to be avoided at an early stage. However, since the gas generated inside a battery is due to electrolysis of water in the electrolyte, the quantity of electrolyte decreases as gas is vented. As a result, this can bring about loss in battery capacity after the safety vent has returned to its normal position. In contrast, when activation pressure is set high as shown by line b in FIG. 2, gas is not ejected even though the internal battery pressure is increased. This can invite the dangers of battery case deformation and closing lid protrusion.

Consequently, activation pressure is set to a suitable value which does not bring about loss in battery capacity and avoids the dangers associated with high internal battery pressure.

However, even when activation pressure is set to a suitable value, the rate of gas generation can be high during malfunctions such as extremely large charging current flow through the battery. In this case, even if the safety vent unit activates, if spring compression is small, the rate of gas ejection by the safety vent unit cannot approach the rate of gas generation.

SUMMARY OF THE INVENTION

The object of the present invention to provide a sealed alkaline storage battery which can eject large quantities of material such as gas and electrolyte, when internal pressure exceeds a given value, by setting the spring compressive load to length change (deformation) ratio to an optimum value.

To resolve the issues described above, the sealed alkaline storage battery of the present invention is provided with a sealing lid. The sealing lid is made up of a sealing plate electrically connected to an electrode unit, having a positive electrode plate, a negative electrode plate, and an intervening separator, which is contained in an external battery case having a cylindrical shape and a bottom; a safety vent unit which closes a gas release hole established through the sealing plate; and a positive electrode cap which accommodates the safety vent unit in a compressed state between the sealing plate and the cap. The safety vent unit is provided with a ventage plate to close the gas release hole and a spring to spring-load the ventage plate against the gas release hole. The ratio of compressive load per length change (deformation) of the spring is 50 N/mm or lower.

Since the ratio of compressive load per length change (compressive load/spring deformation) of the safety vent unit spring of the sealed alkaline storage battery described above is ≦50 N/mm, the distance the ventage plate can move when internal battery pressure exceeds a given value, can be large. Therefore, large quantities of material such as gas and electrolyte can be ejected outside the battery by widely opening the ventage plate from the gas release hole. As a result, external battery case deformation or rupture, due to a rise in internal battery pressure, can be prevented.

The above and further objects and features of the invention will more fully be apparent from the following detailed description with accompanying drawings.

DETAILED DESCRIPTION OF THE INVENTION

The present invention can be optimally applied to sealed alkaline storage batteries such as nickel cadmium storage batteries and nickel hydride storage batteries.

Figure 1:
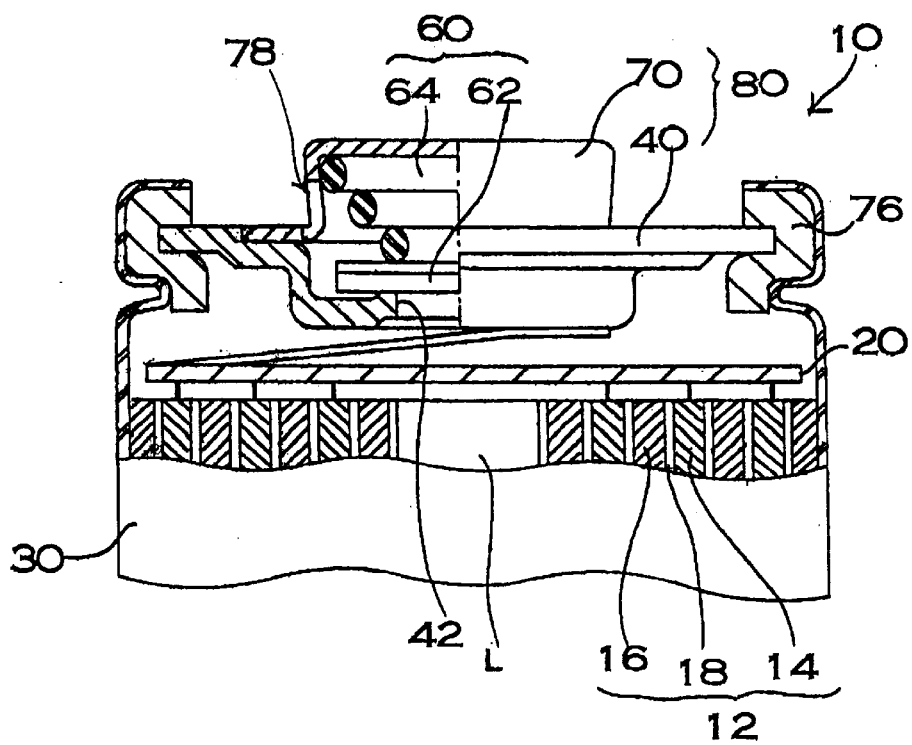
FIG. 1 is a partial cross-sectional view showing a prior art sealed alkaline storage battery.
Figure 2:
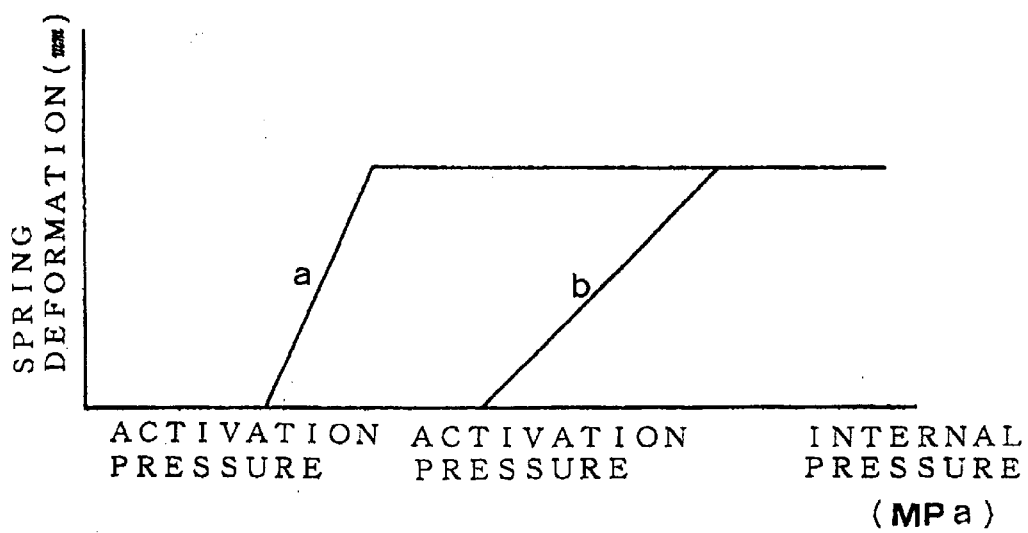
FIG. 2 is a graph showing valve opening characteristics of the safety vent units of prior art sealed alkaline storage batteries.
Figure 3:
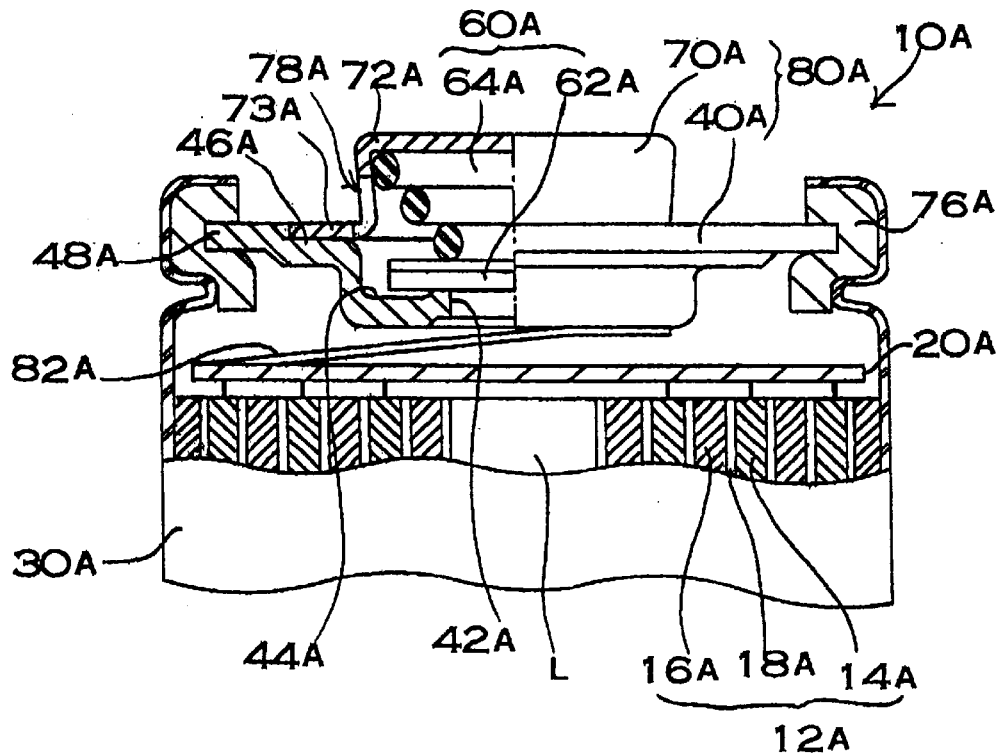
FIG. 3 is a partial cross-sectional view showing the sealed alkaline storage battery of the present invention.

Turning to FIG. 3, a sealed alkaline storage battery 10A of the present invention is shown partially in cross-section. As shown in FIG. 3, the sealed alkaline storage battery 10A is made by inserting a spiral electrode unit 12A and electrolyte L inside a metal cylindrical external battery case 30A having a closed bottom, and tightly sealing the open end of the external battery case 30A with a closing lid 80A.

The electrode unit 12A is made by rolling a positive electrode plate 14A, a negative electrode plate 16A, and a gas permeable separator 18A intervening between the two electrode plates, into a spiral shape (refer to FIG. 3). The positive and negative electrode plates 14A and 16A are formed of conducting electrode core material such as punching metal applied with positive electrode active material and negative electrode active material respectively. A positive electrode collector 20A is electrically connected to the positive electrode plate 14A of the electrode unit 12A, and a negative electrode collector (not illustrated) is electrically connected to the negative electrode plate 16A. The electrode unit 12A is inserted into the external battery case 30A with the positive electrode collector 20A towards the open end. The negative electrode collector and the bottom surface of the external battery case 30A are electrically connected by a method such as welding.

The positive electrode collector 20A is disposed with the closing lid 80A above it and electrically connected to it. The closing lid 80A is made up of a sealing plate 40A with a gas release hole 42A opened at its center, a safety vent unit 60A to close the gas release hole 42A, and a positive electrode cap 70A to hold the safety vent unit 60A in a compressed state between the cap 70A and the sealing plate 40A.

The sealing plate 40A is constructed of conducting material and, as shown in FIG. 3, has a cavity 44A with the gas release hole 42A opened through its center. An indent 46A is established outside the cavity 44A periphery to fit the positive electrode cap 70A, and an outer rim 48A is disposed at the periphery of the indent 46A for caulking the sealing plate 40A into the external battery case 30A.

The safety vent unit 60A is a regulating apparatus which closes the gas release hole 42A, and is disposed in a compressed state between the sealing plate 40A and the positive electrode cap 70A described below. As shown in FIG. 3, the safety vent unit 60A can be made up of a rubber ventage plate 62A which closes the gas release hole 42A and a spring 64A which pushes against the ventage plate 62A. A spring 64A is used which has a compressive load per unit length change (deformation) ratio of 50 N/mm or lower, and preferably 35 N/mm or lower.

Figure 4:
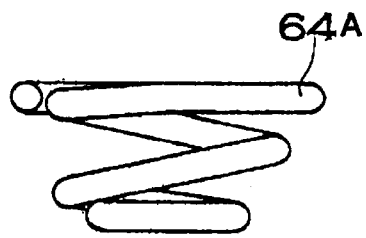
FIG. 4 is a side view showing a conical spring.
Figure 5:
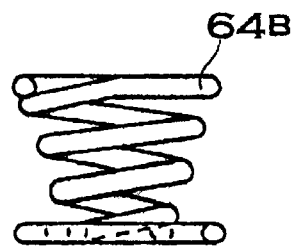
FIG. 5 is a side view showing an hour-glass shaped spring.

The spring 64A can be formed of piano wire wound in a spiral shape. Possible spring shapes are exemplified by the conical (frustum) shaped spring 64A, as shown in FIG. 4, which has its smaller diameter end at the ventage plate 62A, and the hour-glass shaped coil spring 64B, as shown in FIG. 5.

The positive electrode cap 70A is made of conducting material, is formed with a central region which projects upwards, and has a brim 74A which is established outside the central projection 72A periphery, and which fits into the sealing plate 40A indent 46A. Gas venting holes 78A are also opened at the periphery of the projection 72A to expel internally generated materials such as gas and electrolyte to the outside of the battery.

After the safety vent unit 60A is installed in a compressed state between the sealing plate 40A and the positive electrode cap 70A, the closing lid 80A can be completed by electrically connecting the sealing plate 40A and positive electrode cap 70A by resistive welding or laser welding.

Figure 6:
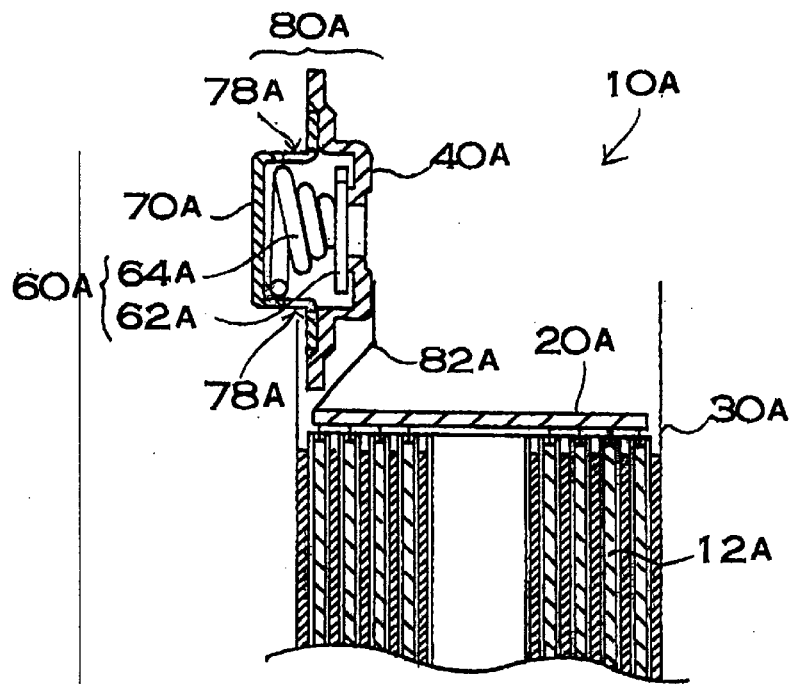
FIG. 6 is a cross-sectional view showing a method of connecting the closing lid and the positive electrode collector.

Electrical connection between the sealing plate 40A and the positive electrode collector 20A can be accomplished by forming a lead-tab 82A on the positive electrode collector 20A. After electrically connecting the sealing plate 40A and the positive electrode collector 20A by welding the lead-tab 82A to the sealing plate 40A, as shown in FIG. 6, the lead-tab 82A can be bent down to attach the closing lid 80A to the external battery case 30A.

Note that electrical connection between the sealing plate 40A and the positive electrode collector 20A is not limited to that described above. For example, the completed closing lid 80A may be placed on top of the positive electrode collector 20A, and an attachment method such as resistive welding or laser welding can be used to directly electrically connect the sealing plate 40A and the positive electrode collector 20A.

Another possible alternative is not to assemble the closing lid 80A prior to external battery case 30A attachment, but rather to place only the sealing plate 40A on the positive electrode collector 20A and join them by an attachment method such as resistive welding or laser welding. Subsequently, the safety vent unit 60A can be disposed in the sealing plate 40A cavity 44A, the positive electrode cap 70A can be fitted onto the sealing plate 40A while compressing the spring 64A of the safety vent unit 60A, and the positive electrode cap 70A and the sealing plate 40A can be joined by an attachment method such as resistive welding or laser welding. In this case, lead-tab formation can be skipped.

After installing the closing lid 80A on top of the positive electrode collector 20A, an insulating gasket 76A is fit around the periphery of the outer rim 48A of the sealing plate 40A. As shown in FIG. 3, a completed sealed alkaline storage battery 10A is produced by bending and crimping the open end of the external battery case 30A thereby caulking the sealing plate 40A into place.

In the, sealed alkaline storage battery 10A with the structure described above, internal battery pressure rises as a result of mechanisms such as internal gas generation due to over-charge or over-discharge, or separator resin melting or electrolyte expansion due to heat from an internal short circuit. When internal battery pressure rises above a given value, the spring 64A which pushes against the ventage plate 62A is compressed by the internal pressure, and the ventage plate 62A moves in a direction opening the gas release hole 42A. When the gas release hole 42A is opened, material such as the gas inside passes through the gas release hole 42A and through the gas venting holes 78A in the positive electrode cap 70A and is expelled outside the battery.

In the present invention, the ratio of compressive load per unit length change (deformation) of the safety vent unit spring 64A is ≦50 N/mm. Therefore, large spring 64A compression and ventage plate 62A movement result from internal battery pressure rise. Consequently, the gas release hole 42A opens wide and large quantities of material such as gas can be expelled outside the battery.

Figure 7:
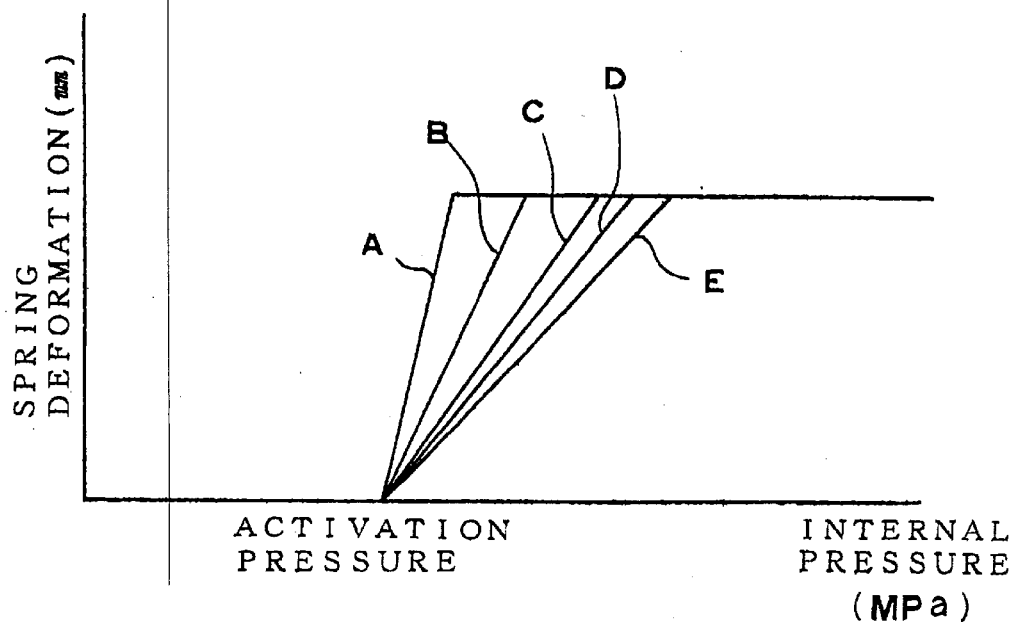
FIG. 7 is a graph showing valve opening characteristics of the safety vent units of embodiments of the present invention.

Turning to FIG. 7, springs 64A were prepared with compressive load per unit length change (deformation) ratios of 25 N/mm (embodiment A), 35 N/mm (embodiment B), 45 N/mm (embodiment C), 50 N/mm (embodiment D), 55 N/mm (comparison example E). An over-charging experiment was conducted and external battery case 30A deformation and closing lid 80A condition were investigated.

Springs 64 wound in conical shapes, as shown in FIG. 4, and made of piano wire 0.8 mm in diameter were used in the experiment. Each end of each spring 64A had a half winding devoted to a spring seat to improve stability. Although the springs had different compressive load per unit length change ratios, the pressure at which the safety vent unit began to open (activate) was set the same for all springs. The pressure for the safety vent unit to begin activation was set the same for each spring by adjusting spring length in the uncompressed state. Since a spring with a low compressive load per unit length change (deformation) ratio was easily deformed, the spring's overall length in the uncompressed state was increased, and the spring was used after compressing it smaller. A spring with a high compressive load per unit length change (deformation) ratio was used after reducing the spring's overall length in the uncompressed state. However, as described by the formula below, the compressive load to spring deformation ratio for each spring can be varied depending on the type and diameter of wire material used, spring core diameter, and number of windings.

$$k=(G \times d^4)/(8 \times n \times D^3)$$

Here k is the compressive load to change in spring length (deformation) ratio, G is the stiffness index of the wire material, d is the diameter of the wire material, n is the number of windings in the spring, and D is the spring's core diameter. Consequently, for a spring which uses 0.8 mm diameter piano wire, the value of the compressive load to spring deformation ratio can be reduced by increasing the number of windings or enlarging the spring's core diameter. Conversely, the value of the compressive load to spring deformation ratio can be increased by reducing the number of windings or shrinking the spring's core diameter.

Spring 64A compressive load was measured with compression test equipment by compressing the spring 64A 1 mm each minute, and the measured values were used as the (compressive load)/(spring deformation) ratio. 300 cells of size 2000 mAh-SC sealed alkaline storage batteries 10A were made with safety vent units 60A using each of the prepared springs 64A. An over-charging experiment with a charging rate of 20A and an over-charge condition of 300% was performed. Experiment results are shown in Table 1.

TABLE 1

| Lot | A | B | C | D | E |
|---|---|---|---|---|---|
| Compressive load (N) Spring deformation (mm) | 25 | 35 | 45 | 50 | 55 |
| Amount of external battery case bottom deformation (%) | 50 | 70 | 85 | 95 | 100 |
| Closing lid drop-out (number of units) | 0 | 0 | 0 | 0 | 1 |

Referring to Table 1, it is clear that the amount of external battery case bottom deformation was less for the embodiments of this invention A through D than for the comparison example E, and that closing lid 80A drop-out did not occur for the embodiments of this invention A through D. This was a result of large spring 64A deformation, ventage plate 62A movement, and ejection of large quantities of material such as gas and electrolyte through the gas release hole 42A when internal battery pressure rose due to over-charging. Although external battery case bottom deformation with internal battery pressure rise is recognized for the embodiments of this invention, no closing lid 80A drop-out occurred. Comparing individual embodiments of this invention, it is clear the lower the compressive load to spring deformation ratio, the more external battery case bottom deformation can be reduced.

In contrast, all of the batteries of the comparison example showed external battery case bottom deformation, and of those batteries, one showed closing lid 80A drop-out. This was because the compressive load to spring deformation ratio was too large resulting in insufficient movement of the ventage plate 62A and insufficient ejection of material such as gas to the outside.

By making the safety vent unit 60A compressive load to spring deformation ratio ≦50 N/mm as described above, large quantities of material such as gas can be ejected outside the battery by the safety vent unit 60A even when internal battery pressure rises due to mechanisms such as gas generation and electrolyte expansion during over-charging. Therefore, external battery case bottom deformation can be suppressed, and closing lid 80A drop-out can be eliminated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A sealed alkaline storage battery comprising:
   (a) a cylindrically shaped external battery case having a closed bottom;
   (b) an electrode unit held inside the external battery case and having a positive electrode plate, a negative electrode plate, and an intervening separator between the electrode plates;
   (c) a sealing plate electrically connected to the electrode unit, the sealing plate being provided with an inwardly protruding projection at its central region and an insulating gasket at a peripheral region of the sealing plate;
   (d) a safety vent unit comprising a ventage plate for closing a gas release hole in the sealing plate and a spring for biasing the ventage plate towards the gas release hole; and
   (e) a positive electrode cap for retaining the safety vent unit in a compressed state between itself and the sealing plate, the positive electrode cap being provided with an outwardly protruding projection at its central region and at least one gas venting hole, wherein the spring is disposed in the outwardly protruding projection of the positive electrode cap and the inwardly protruding projection of the sealing plate, and wherein the ratio of compressive load to length deformation of the spring is less than or equal to 50 N/mm.

2. A sealed alkaline storage battery as recited in claim 1, wherein the ratio of compressive load to length deformation of the spring is less than or equal to 35 N/mm.

3. A sealed alkaline storage battery as recited in claim 1, wherein the sealing plate is made of conducting material, the gas release hole is opened through a center portion of the sealing plate, and an indent is provided outside the downward protruding projection to receive the positive electrode cap.

4. A sealed alkaline storage battery as recited in claim 1, wherein the ventage plate is made of rubber.

5. A sealed alkaline storage battery as recited in claim 1, wherein the spring is formed of piano wire wound into a spiral shape.

6. A sealed alkaline storage battery as recited in claim 1, wherein the spring has a conical shape with the small diameter end at the ventage plate.

7. A sealed alkaline storage battery as recited in claim 1, wherein the spring is an hour-glass shaped coil spring.

8. A sealed alkaline storage battery as recited in claim 1, wherein the positive electrode cap is made of conducting material.

9. A sealed alkaline storage battery as recited in claim 1, wherein the,positive electrode cap has a brim outside a periphery of the outwardly protruding projection which fits into an indent in the sealing plate, and a plurality of gas venting holes opened through the projection periphery to expel internally generated materials directly to the outside of the battery.

10. A sealed alkaline storage battery as recited in claim 1, wherein the safety vent unit is installed in a compressed state between the sealing plate and the positive electrode cap, and the sealing plate and positive electrode cap are electrically connected by resistive welding.

11. A sealed alkaline storage battery as recited in claim 1, wherein the safety vent unit is installed in a compressed state between the sealing plate and the positive electrode cap, and the sealing plate and positive electrode cap are electrically connected by laser welding.

12. A sealed alkaline storage battery as recited in claim 1, wherein an insulating gasket is fit around the outer rim of the sealing plate, and the open end of the external battery case is bent and crimped thereby caulking the sealing plate into place.

\* \* \* \* \*